United States Patent [19]

Lewis

[11] Patent Number: 5,210,641
[45] Date of Patent: May 11, 1993

[54] HIGH CONTRAST FRONT PROJECTION DISPLAY SCREEN

[76] Inventor: Richard B. Lewis, 7086 Salmon Cr. Rd., Williamson, N.Y. 14589

[21] Appl. No.: 877,659

[22] Filed: May 1, 1992

[51] Int. Cl.$^5$ .............................................. G03B 21/60
[52] U.S. Cl. .................................. 359/448; 359/459
[58] Field of Search ............... 359/443, 448, 449, 454, 359/455, 459

[56] References Cited

U.S. PATENT DOCUMENTS

| | | | |
|---|---|---|---|
| 1,942,841 | 12/1931 | Shimizu | 359/454 |
| 2,358,070 | 6/1942 | Holmes | 359/454 |
| 2,991,693 | 7/1961 | MacNeille | 359/455 |
| 3,180,214 | 4/1965 | Fox | 359/454 |
| 3,191,495 | 6/1965 | Miller | 350/129 |
| 3,704,055 | 11/1972 | Hong | 350/128 |
| 4,026,634 | 5/1977 | Fukushima | 350/128 |
| 4,235,513 | 11/1980 | Vlahos | 350/129 |
| 4,298,246 | 11/1981 | Iwamura | 350/122 |
| 4,606,609 | 8/1986 | Hong | 350/128 |

Primary Examiner—Richard A. Wintercorn

[57] ABSTRACT

Disclosed is a front projection display screen formed from a multiplicity of optical cells juxtaposed to define a surface. Each of the cells comprises a directional filter and light converging optics. The directional filter, which covers substantially all of the face of the optical cell, is adapted to pass light from the direction of the projector and to absorb light from other directions except at a small, transparent return aperture. The light converging optics are adapted to focus the substantially parallel light from the projector at the return aperture part of the directional filter and to spread it into a large solid angle. The combination provides an image of improved visual contrast by absorbing background light and returning image light to viewers.

5 Claims, 4 Drawing Sheets

HIGH CONTRAST FRONT PROJECTION DISPLAY SCREEN

BACKGROUND OF THE INVENTION

1. Field of the Invention

This invention relates to an improved front projection display screen which efficiently spreads over a viewing space the image light from a projector while absorbing background light from other sources both inside and outside the viewing space, thus providing an image of improved contrast under practical conditions of ambient light and projector power.

2. Description of the Prior Art

Earliest front projection screens were simply matte white surfaces such as a white sheet or a coat of dull white paint. Matte surfaces have two flaws which make them useful only in dark viewing areas or with very powerful projectors. First, they use image light inefficiently by spreading it into much of the half space in front of the screen, so that most goes in directions in which there are no viewers. Second, matte surfaces efficiently return to the viewing space much of the light striking them from sources of background light. It is well known that such background light washes out image contrast and color.

To improve front projection screens there have been proposed various forms which comprise a multiplicity of optical cells each of a size smaller than can be resolved by the eyes of a viewer. The proposed improvements lie in the internal structure of the cells and it is convenient to describe just the cell structure it being understood that the optical cells are meant to be arranged side by side to form a screen.

Prior art optical cells are of two kinds. The first kind of cell simply concentrates image light into a solid angle which is smaller than that illuminated by a matte surface screen. Thus image light within this solid angle is increased relative to the case of a matte surface by a factor called gain. Such screens are called gain screens. Gains on the order of 10 are achievable without much loss in viewing angle, where viewing angle is the angle from the screen normal to the most laterally displaced viewer. Higher gains generally require that the viewing angle be decreased in order to squeeze the viewers inside the solid angle illuminated by screen optical cells.

The optical cells of such simple gain screens contain no light absorbing material. Thus background light striking them must return to the front half space and some of it will be returned to the viewing space. Moreover, much of the background light from within the viewing space will be returned to other parts of the viewing space with the gain of the screen. Unless the whole room is blacked out, sources of background light within the viewing space are inevitable. Besides obvious, active sources such as lamps, there are large area sources such as furniture, walls, and the viewers themselves which are, if visible to the eye, also sources of background light. Thus simple gain screens show poor image contrast in many practical combinations of background lighting and projector power. Nevertheless, all front projection screens known to me employ optical cells of this first kind.

The second kind of optical cell contains light absorbing material and optical elements combined in some way intended to perform all of the following functions: to absorb background light, to let pass image light, and to spread image light back throughout the viewing space. Such discrimination between background light and image light is really directional discrimination, based on the fact that image light strikes each optical cell from the direction of the projector while background light strikes from many other directions. In the second kind of optical cell the optical elements commonly confer screen gain as well as act as part of the discriminating scheme.

Heretofore inventors have attempted to effect discrimination between image light and background light by converging the image light to a focus or a near focus at an aperture or a small mirror in a surrounding blackened surface. Because background light does not come from the direction of the projector it converges at some other place within the cell, thus missing the aperture or small mirror and being absorbed by the blackened surface. This approach may be termed discrimination by focus. However, light turned back from a focus just retraces the paths that focused it, thus returning in a parallel beam toward the projector and not spreading across the viewing space. Heretofore inventors of background discriminating reflection screens have retained the idea of directional discrimination by focus and attempted to avoid the retrace problem. The resulting optical cell designs suffer from complexity, difficulty of manufacture, and sometimes imperfect discrimination. A manufacturable screen for small room viewing must have optical cells of largest face dimension about 1 millimeter and internal structure smaller by at least a factor of 10. It must contain from about 200,000 to about 2,000,000 such cells and all of them must closely match each other in optical performance in order to avoid mottled and uneven images.

OBJECTS AND ADVANTAGES

Accordingly it is an object of my invention to provide an improved front projection screen that makes efficient use of projected light and absorbs light from directions other than the projector so as to give pictures of superior contrast and color purity.

It is another object to provide an improved background discriminating screen in which discrimination by focus is replaced with a superior means of discrimination.

It is another object to provide an improved front projection screen which is easier to manufacture than previously.

It is another object to provide an improved front screen which has theoretically perfect discrimination against background light.

It is another object to provide an improved screen with optical uniformity sufficient to yield effectively uniform image brightness.

Further objects and advantages will become apparent from a consideration of the drawings and ensuing descriptions.

DETAILED DESCRIPTION OF THE INVENTION

Figure 1:
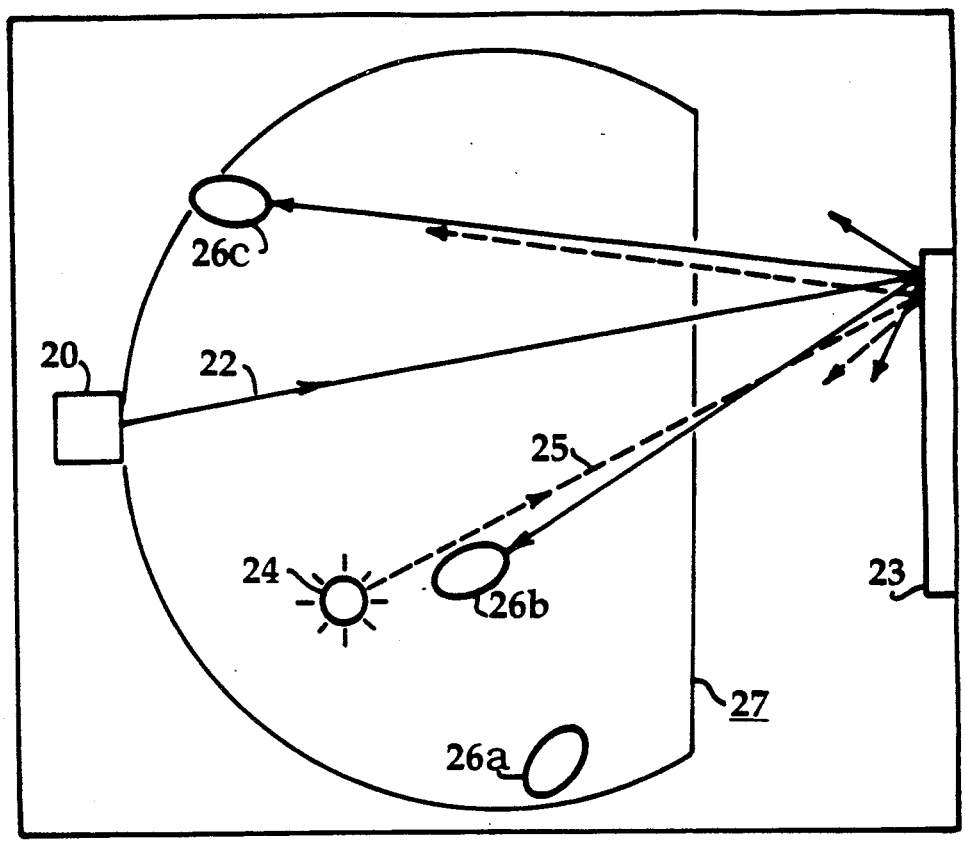
FIG. 1 is in plan view the layout of an illustrative front projection setup.

FIG. 1 shows in plan view the layout of an illustrative front projection setup. There is shown a projector 20, a front projection screen 23, and several viewers 26a,b, and c. The space potentially occupied by viewers is called the viewing space and is designated 27.

Image light 22, shown as a solid line, strikes screen 23 and must be spread by the screen into a solid angle large enough to fill the viewing space. 25 is a ray of background light from background light source 24 which must be absorbed by the screen for good image contrast. The internal structure of the optical cells of the screen must absorb background light ray 25 and pass the almost coincident image light rays 22.

Figure 2:
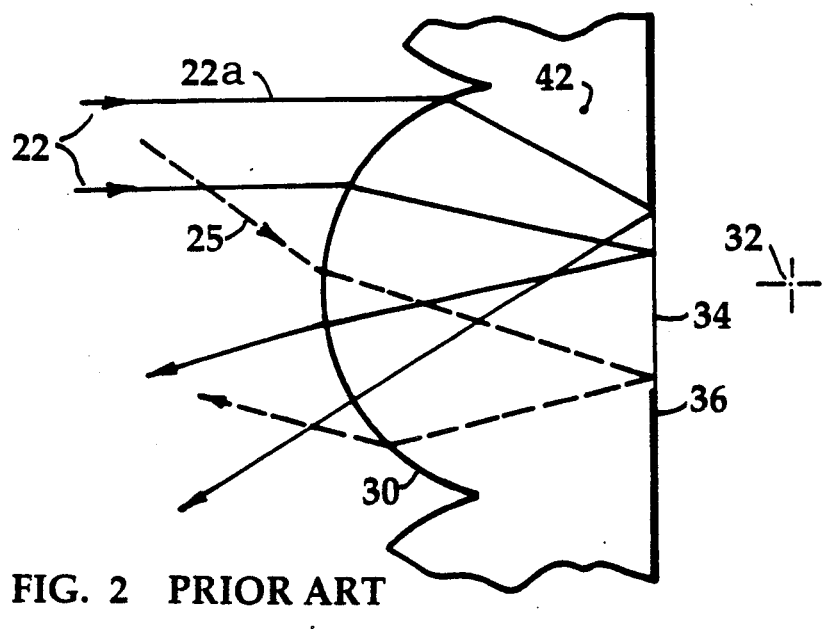
FIG. 2 is a section in plan of a prior art reflection screen optical cell and portions of ajacent cells according to Shimizu.

FIG. 2 is a section in plan of a prior art reflection screen optical cell (Shimizu U.S. Pat. No. 1,942,841). Image light rays 22 are converged by converging refractive surface 30 onto plane mirror patch 34 on a blackened surface 36. Mirror patch 34 then returns them to the viewing space. Ray 22a is the ray returned at the largest angle to the incoming direction and is seen to provide a viewing angle of about 45 degrees. There is shown also a ray of background light 25 which escapes absorption and also returns to the viewing space. Ray traces have been sketched for a cell refractive index of about 1.55, which is typical of transparent plastics. Discrimination is imperfect because of the large size of mirror patch 34.

Figure 3:
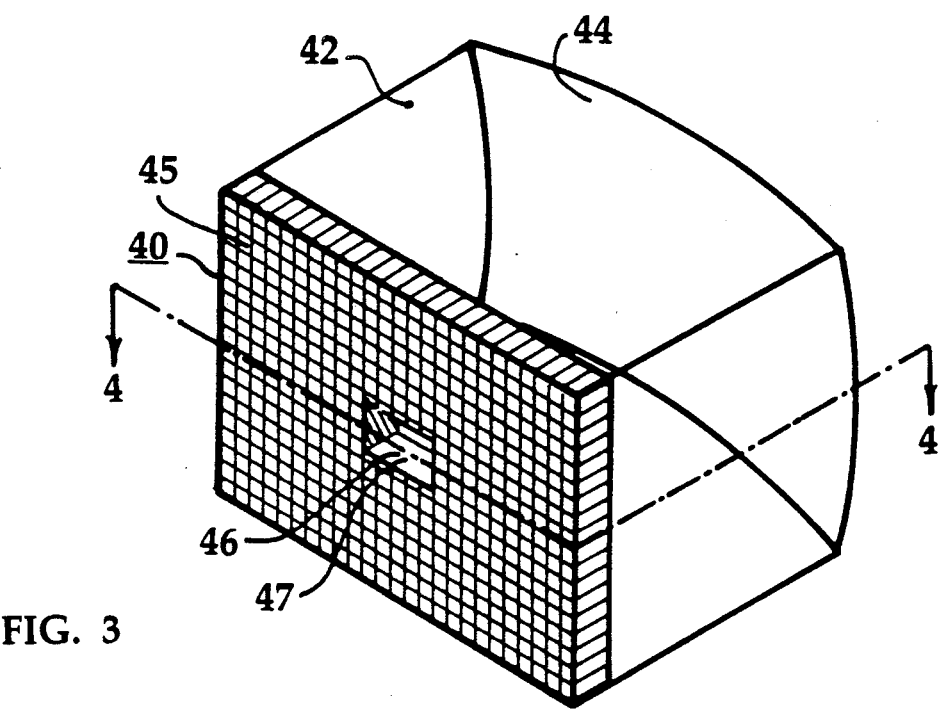
FIG. 3 is a greatly magnified view of an optical cell of the preferred embodiment of my invention.
Figure 4:
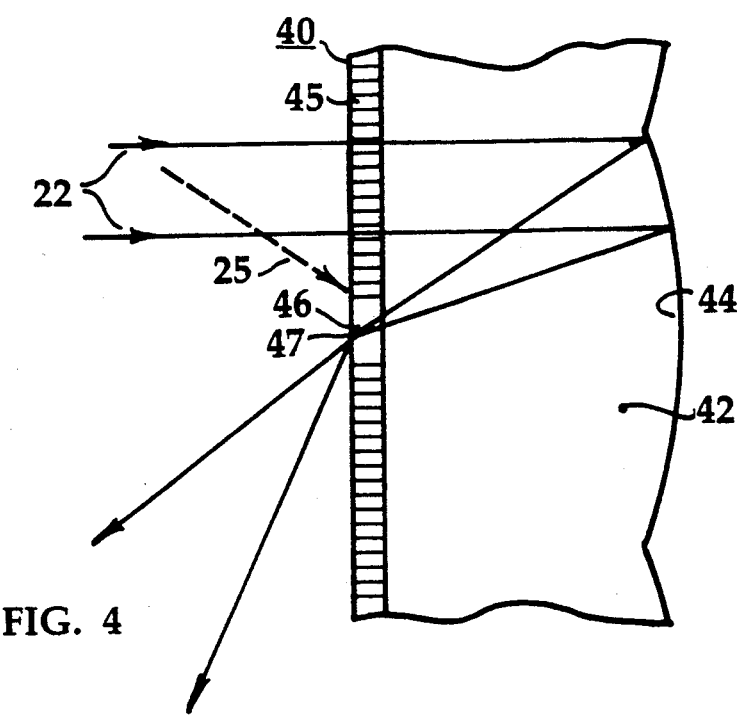
FIG. 4 is a section in the plane 4—4 of the optical cell of FIG. 3 together with portions of ajacent cells.

FIG. 3 is a greatly magnified view of an optical cell of the preferred embodiment of my invention. FIG. 4 is a section in the plane 4—4 of the optical cell of FIG. 3 together with portions of ajacent cells.

Referring to FIGS. 3 and 4, 42 is a transparent body such as polymethyl methacrylate. 44 is a converging mirror surface pressed or otherwise formed into the back of body 42 and provided with a reflective mirror surface, for example of vacuum evaporated aluminum. Bonded to the front surface of body 42 is a directional filter 40 having the property that over most of its surface it absorbs substantially all light striking it except for that light propagating in a determined pass direction and in a small cone of directions about that pass direction, which is allowed to pass with little attenuation. Return aperture 46 is a small region of filter 40 which is modified to pass light propagating in any direction.

The pass direction of directional filter 40 is chosen to lie on the line joining the optical cell to the projector. The curvature of converging mirror surface 44, the thickness of body 42, and the location of aperture 46 are chosen to cause image light to focus at a focal region 47 at aperture 46.

Preferably directional filter 40 should have the following properties: The cone of passed light should be less than about 10 degrees half angle. Filter thickness should be less than about one quarter the focal length of the converging element. Transmission of light striking at an angle outside the acceptance cone should be less than about 10% and transmission on the axis of the acceptance cone should be greater than about 70%.

In operation (See FIGS. 1 and 4), image light 22 incident from the direction of the projector strikes everywhere on the entrance face of the cell, passes directional filter 40 with little attenuation, and strikes converging mirror surface 44. Mirror 44 spreads the initially collimated image light 22 into the large solid angle necessary to fill the viewing space and also focuses it in a focal region 47 at aperture 46 through which it escapes with little attenuation toward the viewing space.

Background light 25, show as a dashed line, moving in a direction not passed by filter 40 is absorbed by filter 40. The relatively small fraction of background light striking return aperture 46 is returned toward the projector and not not toward viewers located away from the projector-screen axis.

Image light 22 escapes absorption by having the proper direction of propagation compatible with the propagation control means 45 in directional filter 40 and not by being focussed at an aperture or small mirror. This fundamental change from prior art eliminates the retrace problem and the complexity that results from attempts to avoid its consequences.

Most inbound background light striking directional filter 40 is absorbed. Any that penetrates must, to reach the viewing space, traverse the directional filter again on the way back out of the cell. Thus the attenuation of directional filter 40 is applied twice to background light.

Because the light absorbing material is on or near the front face of each optical cell any light scattering imperfections internal to each cell are not illuminated. Thus less ideal performance is required of each cell.

Figure 5:
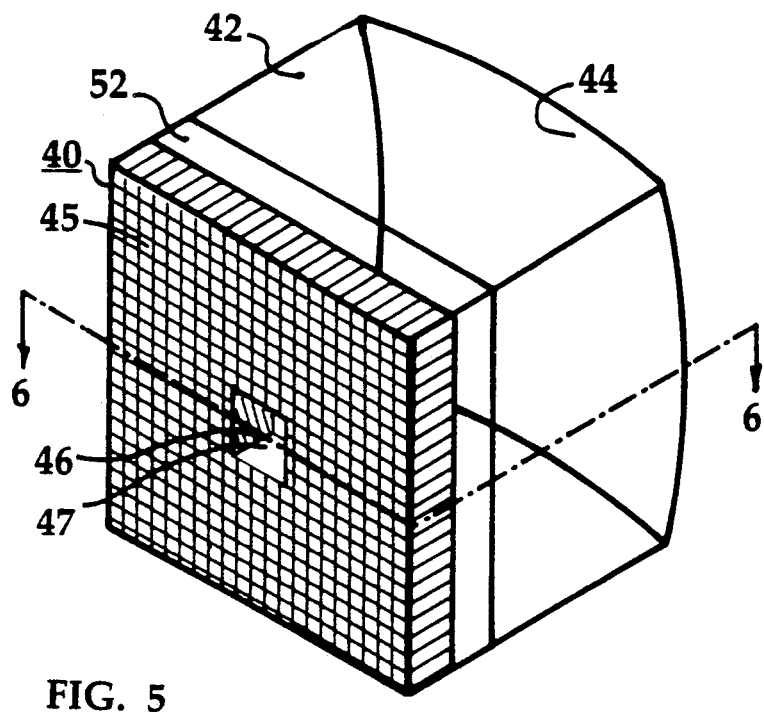
FIG. 5 is a greatly magnified view of an optical cell of a second embodiment of my invention.
Figure 6:
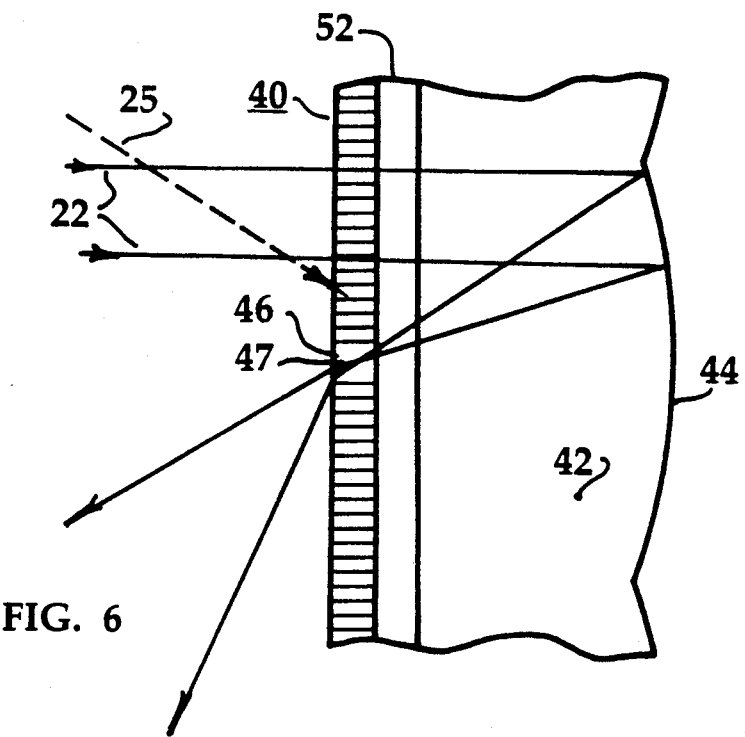
FIG. 6 is a section in the plane 6—6 of the optical cell of FIG. 5 together with portions of ajacent cells.

Referring to FIGS. 5 and 6, the optical cell is similar to that of the preferred embodiment except for the addition of ultraviolet absorbing layer 52, located between directional filter 40 and body 42. Layer 52 was used in one means of manufacture of my invention. This embodiment illustrates the manufacture of a test piece containing 900 cells in a square array 30×30 cells on a side. It consists of a series of steps each generalizable to mass production methods.

STEP 1

A hot polished steel tool was pressed into a block of PMMA (polymethyl methacrylate, plexiglass available from Rohm and Haas) in a step and repeat operation to form a square array of square spherical depressions on 2 millimeter centers, each depression having a radius of curvature of 1.27 millimeters. A thin aluminum mirror coating was next vacuum evaporated onto this tooled face. The PMMA block was then assembled, tooled face inwards, with an opposed flat cover plate and flexible rubber sidewalls to form a mold cavity having the dimensions of transparent body 42. Shims were used to hold spacing and alignment.

Next, An optical grade epoxy resin (Stycast 1266 from Emerson and Cuming, Canton, Mass.) was cast in the mold cavity and allowed to cure. On dissassembly of the mold the aluminum mirror coating adhered to the epoxy providing an array of converging mirror surfaces 44. At this stage transparent body 42 and mirror surfaces 44 form a gain screen of the first type described above. Because of its geometry its gain is low, approximately 1.1.

STEP 2

As a precursor to filter 40 a light sensitive film was prepared using diazotype technology which is described, for example, in the book "Light Sensitive Systems" by Jaromir Kosar, John Wiley, N.Y., 1965.

Into about 10.7 grams of solvent mixture having the composition 80% toluene and 20% 1-propanol there were dissolved about:
- 1.26 grams cellulose acetate-butyrate CAB 381-20 from Tennessee Eastman Company
- 0.54 grams polyethyl methacrylate Elvacite 2043 from DuPont
- 0.09 grams butyl benzyl phthalate CAS No 85-68-7 from Monsanto to yield a clear film-casting dope.

Separately there were dissolved in 1.5 grams of glacial acetic acid about:
- 0.034 grams p-diazo-N,N-diethylaniline tetrafluoborate CAS No 347-46-6
- 0.042 grams diisopropyl napthalene sulfonic acid
- 0.008 grams 2,3 dihydroxynapthalene CAS No 92-22-4

The resulting yellow solution was mixed thoroughly with the film casting dope, degassed by warming, and cast onto a smooth, level table having an area about 100 cm$^2$ enclosed by dams. The table was warmed to about 45 degrees centigrade and warmed air circulated across its surface.

After about 2 hours most of the solvents had been removed leaving a film that was stripped from the table. The film was clear, bright yellow, pliable, and about 130 micrometers thick.

STEP 3

Ultraviolet absorbing layer 52 was cast from another batch of the film casting dope used in step 2. To this were added about 1.5 grams of glacial acetic acid and 0.010 grams of an ultraviolet absorber Tinuvin 328 (CAS No 25973-55-1) from Ciba-Geigy. The final thickness of layer 35 was about 130 micrometers. These conditions were chosen to make a film which transmitted visible light and absorbed almost all light of wavelength less than about 380 nanometers.

STEP 4

The result of step 1, the ultraviolet absorbing layer of step 3, and the light sensitive film of step 2 were assembled as shown in FIG. 5 with light coatings of cement between them and held between flat surfaces under gentle pressure for one hour after which the cemented joints were firm. A suitable cement was found to be Duco brand 20%, ethyl alcohol 72%, and ethyl acetate 8%. After about 24 hours the assembly was practically optically clear and solvent free.

STEP 5

The assembly of step 4 was held in face to face contact with a metal cross line screen and exposed through the screen to a practically parallel beam of ultraviolet light incident on it normally.

The screen had a spatial frequency of about 400 lines per centimeter and line widths of about 5 micrometers. It was made by the Metrigraphics division of Dynamics Research Corporation of Wilmington, Mass.

The source of ultraviolet light was a 500 watt high pressure mercury short arc imaged on an aperture about 1.5 centimeters in diameter. Distance from aperture to test assembly was about 75 centimeters. There was provision for inserting into the exposure beam a filter (type UG-1 from Schott Glass, Durea Penna.), which absorbed much of the light of wavelength greater than about 380 nanometers.

The exposure sequence was about 3.25 minutes with the UG-1 filter out of the beam followed by a further 36 minutes with the filter in the beam. Exposure conditions were chosen to bleach away the diazo compound under the open areas of the screen, to leave it under the lines of the screen, and to bleach a small return aperture 46. The function of ultraviolet absorbing layer 52 is to reduce the amount of bleaching light returning toward the position of aperture 46. It was found that without layer 52 scattered ultraviolet light bleached too big an aperture.

STEP 6

The second embodiment was completed by developing the exposed assembly in ammonia gas at 1 atmosphere for 20 minutes, after which the bleached regions were clear and the unbleached regions were a deep bluish black. The directional filter 40 thus formed comprises a return aperture 46 and light propagation control means 45 comprising an array of light transmitting tubes about 15 micrometers square and about 130 micrometers long with light absorbing walls about 5 micrometers thick. More than half the visible light striking filter 40 is transmitted if it moves in the same direction as the ultraviolet light used to bleach. Visible light moving in other directions will strike the absorbing walls and be removed from the system.

Unlike any front projection screen known to me, this embodiment appears black in ambient lighting except where struck by properly directed image light.

To quantify performance two screen surfaces were compared. The first was a piece of bond paper, which approximated a matte surface and served as a reference. The other surface was the second embodiment made in steps 1 through 6 above.

Two light sources were used alternately. The first, a slide projector, supplied image light. It directed a collimated beam normal to the screen surface under test and gave about 900 foot candles illumination. The second light source, two 40 watt flourescent lamps in an overhead fixture, simulated background light. It supplied a relatively diffuse illumination of about 20 foot candles in the plane of the screen surface.

First, the piece of bond paper was illuminated by image light and measured by a reflection photometer fixed to register light returning at 30 degrees from the screen surface normal. This was assigned a value of 100 units.

Next, illumination was supplied by background light and the photometer was observed to register 5 units.

The bond paper was then replaced by the second embodiment. With image light it registered 36 units and with background light it registered 0.2 units.

These results are summarized in table 1. Contrast, in the third column, is the ratio of image light to background light.

TABLE 1

|  | Image Light | Background Light | Contrast |
| --- | --- | --- | --- |
| Bond paper | 100 | 5 | 20 |
| Second embodiment | 36 | 0.2 | 180 |

Thus the second embodiment shows an almost tenfold increased contrast relative to a a matte surface. This improvement is due to its ability to discriminate against background light and is not the result of screen gain. This is known because the result of step 1 tested as a simple gain screen registered about 105 units under image light in the test above. Thus its gain was about 1.1.

It will be understood that this embodiment is less than ideal because it was made by hand with relatively available materials. For ease of working the cells are larger than desireable for projection television in the home and the cell gain in needlessly low. The diazotype technology used here yielded slightly bluish absorbing parts and clear areas that transmit only about half of the image light passing twice through them. Illuminated parts show a slight scintillation as the observer moves. None of these are shortcomings in principal. Cells about half this size and color balanced diazo formulations can be made. Scintillation can be reduced by removing the periodicity of the directional filter, by making it finer, or by adding a slightly scattering front surface.

Figure 7:
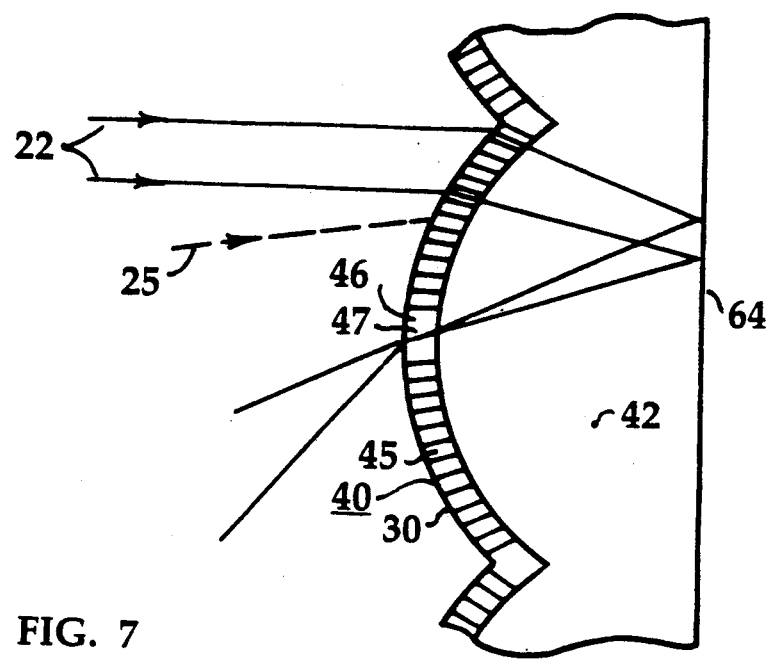
FIG. 7 is a section in plan of an optical cell of a third embodiment of my invention together with portions of ajacent cells.

FIG. 7 is a section in plan of an optical cell of a third embodiment of my invention together with portions of ajacent cells. It comprises a converging refractive surface 30, a directional filter 40 covering most of the entrance face, a plane mirror surface 64, and a return aperture 46 located at the focus of surface 30. Its principle of operation is identical to that of the previous embodiments despite its different appearance.

Figure 8:
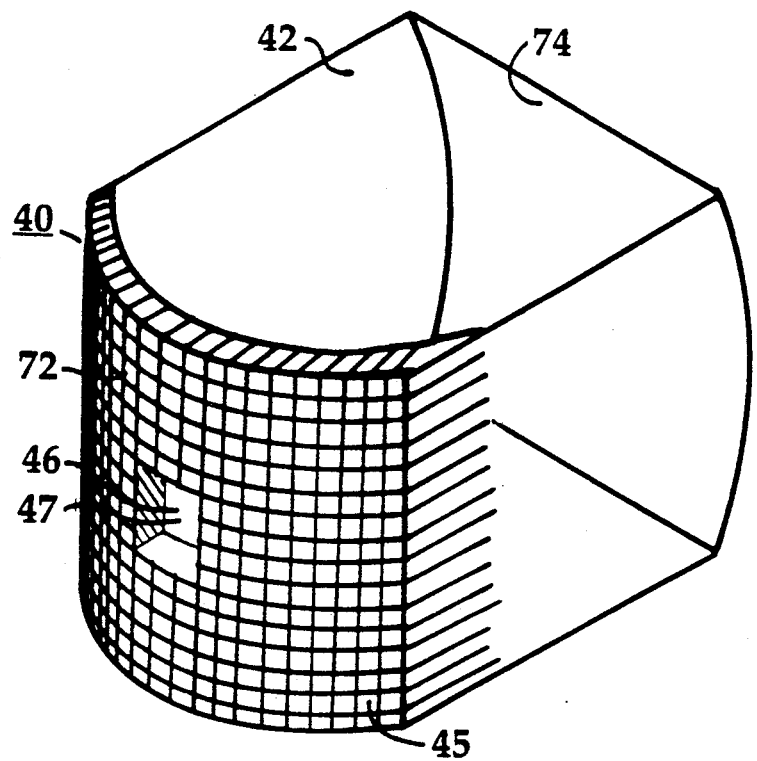
FIG. 8 is a greatly magnified view of an optical cell of a fourth embodiment of my invention.

FIG. 8 is a greatly magnified view of an optical cell of a fourth embodiment of my invention. The single converging surface of previous embodiments is replaced by a combination of cylindrical converging refractive surface 72 and cylindrical converging mirror surface 74. Surfaces 72 and 74 act at right angles to each other to focus image light at return aperture 46. The principle of operation is identical to that of the previous embodiments. This embodiment is relatively easier to make because tooling for arrays of cylinders is easier to make than tooling for arrays of double curved surfaces.

The forms of the optical cells that have been described are adapted to spread image light both horizontally and vertically. It is clear that the invention can be applied to cells for spreading image light in only one direction.

The preferred method of making directional filter 40 is by a positive working photographic process such as that described in the second embodiment. The exposure mask may be a regular pattern as described or it may be a relatively random dot pattern. It may be a metal mask or it may be made of material which absorbs ultraviolet light while passing visible light, so it can be left in place on the completed screen.

Another method of making direction filter 40 is to align by an electric field a mixture of fine black fibers suspended in a transparent resin and then cure the resin to form a sheet which would then be relatively transmitting along the alignment direction and absorbing in other directions. After the sheet is bonded to the face of the screen, return apertures 46 are formed by exposure to a light flash of energy sufficient to destroy or thermally bleach the fibers at the foci of the converging elements.

Still another method of making directional filter 40 is to provide dye molecules with a single axis of light absorption aligned along the intended pass direction. The return aperture is again formed by exposure to a light flash.

The forms of directional filter 40 that have been described are adapted to absorb light from all but a narrow pencil of directions. There is another form comprising an array of microscopic slats that absorbs light from all but a thin sheet of directions and provides useful but less improved image contrast.

Ultraviolet absorbing layer 52 of the second embodiment functions to reduce the amount of bleaching light returning toward the position of aperture 46. There are other ways of doing this. Dyes may be used providing they are afterwards bleached to pass visible light, or it is possible to supply the reflective mirror surface such as evaporated aluminum after the bleaching exposure rather than before.

It will be clear from what has been said that the optical cells of my invention may be arranged in either a flat or curved screen and that the pass direction for image light may be normal to the screen as illustrated or may be oblique to the screen. Particularly in the case of oblique image light the cells may be provided with tilted reflecting surfaces, refractive wedges, or other means to improve off axis performance. Also the cells may be square on a square array or they may be on a regular or flattened hexagonal array. Further, the screen face may be equipped with anti reflection coatings, ultraviolet filters to prevent dye fading, and scratch-resisting hard coatings.

I claim:

1. A projection screen (23) for displaying optical images projected onto the front thereof by a projector, comprising a multiplicity of optical cells, each of said cells (FIG. 3) comprising:
    a. means (44) for converging light from said projector at a determined focal region (47) within said cell, and
    b. directional filter means (40) covering substantially all of the face of said cell, said directional filter means comprising a transparent return aperture (46) located at said focal region and light propagation control means (45) to pass a substantial fraction of light incident from the direction of said projector and to absorb substantially all light incident from other directions.

2. The screen of claim 1 wherein said means for converging light is a concave mirror surface (44).

3. The screen of claim 1 wherein said means for converging light is a refracting surface (30-FIG. 7).

4. The screen of claim 1 wherein said directional filter means comprises an exposed photosentitive material.

5. The screen of claim 1 wherein said propagation control means is an array of tubes coaxial with the direction of propagation of the central ray of light (22) from said projector.

* * * * *